US008682928B2

(12) United States Patent
Burton et al.

(10) Patent No.: US 8,682,928 B2
(45) Date of Patent: *Mar. 25, 2014

(54) METHOD, SYSTEM AND PROGRAM FOR DIRECT CLIENT FILE ACCESS IN A DATA MANAGEMENT SYSTEM

(75) Inventors: David Alan Burton, Vail, AZ (US); Douglas Alan Williams, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 535 days.

This patent is subject to a terminal disclaimer.

(21) Appl. No.: 11/615,681

(22) Filed: Dec. 22, 2006

(65) Prior Publication Data
US 2007/0112787 A1 May 17, 2007

Related U.S. Application Data

(63) Continuation of application No. 10/038,165, filed on Jan. 2, 2002, now Pat. No. 7,177,868.

(51) Int. Cl.
*G06F 17/30* (2006.01)
(52) U.S. Cl.
USPC .......................................... 707/781
(58) Field of Classification Search
USPC .............................. 707/705, 781
See application file for complete search history.

(56) References Cited

U.S. PATENT DOCUMENTS

| 5,014,192 | A | | 5/1991 | Mansfield et al. | |
|---|---|---|---|---|---|
| 5,586,310 | A | * | 12/1996 | Sharman | 1/1 |
| 5,675,802 | A | * | 10/1997 | Allen et al. | 717/103 |
| 5,873,085 | A | * | 2/1999 | Enoki et al. | 707/10 |
| 5,909,540 | A | | 6/1999 | Carter et al. | |
| 5,918,229 | A | | 6/1999 | Davis et al. | |
| 5,925,228 | A | | 7/1999 | Panitz et al. | |
| 5,987,506 | A | | 11/1999 | Carter et al. | |
| 6,026,474 | A | | 2/2000 | Carter et al. | |
| 6,038,564 | A | | 3/2000 | Sameshima et al. | |
| 6,110,228 | A | | 8/2000 | Albright et al. | |
| 6,158,047 | A | | 12/2000 | Le et al. | |
| 6,324,581 | B1 | * | 11/2001 | Xu et al. | 709/229 |
| 6,898,670 | B2 | | 5/2005 | Nahum | |
| 7,440,994 | B2 | * | 10/2008 | Harrow et al. | 709/203 |
| 2003/0004981 | A1 | * | 1/2003 | Kaneda et al. | 707/204 |
| 2003/0093413 | A1 | * | 5/2003 | Dettinger et al. | 707/3 |
| 2003/0110264 | A1 | * | 6/2003 | Whidby et al. | 709/227 |

OTHER PUBLICATIONS

"File Migration in Distributed Computer Systems", California Univ., Berkeley. Lawrence, Berkeley Lab, copyright © 1982.*

(Continued)

*Primary Examiner* — Huawen Peng
(74) *Attorney, Agent, or Firm* — Rabindranath Dutta; Konrad Raynes Davda & Victor, LLP

(57) ABSTRACT

Provided is a method, system, and program implemented by a server for controlling and providing access to a file to at least one remote computer over a network. The server maintains metadata about files. The files are maintained at remote storage locations. The server receives a request from the remote computer for a filename of a requested file over the network. The server determines from the metadata one remote storage location address associated with the filename where the requested file is located. The server then updates the metadata for the requested file and sends the storage location address to the remote computer.

33 Claims, 10 Drawing Sheets

(56) References Cited

OTHER PUBLICATIONS

Porcar, "File Migration in Dsitributed Computer Systems", California Univ., Berkeley. Lawrence, Berkeley Lab, copyright © 1982, pp. 83-135.*
First Office Action IFW dated Jun. 1, 2004, 17 pp, for U.S. Appl. No. 10/038,165, filed Jan. 2, 2002 by inventors D.A. Burton, et al.
Response to First Office Action IFW dated Sep. 1, 2004, 24 pp, for U.S. Appl. No. 10/038,165, filed Jan. 2, 2002 by inventors D.A. Burton, et al.
Final Office Action IFW dated Apr. 21, 2005, 24 pp, for U.S. Appl. No. 10/038,165, filed Jan. 2, 2002 by inventors D.A. Burton, et al.
Response to Final Office Action IFW dated Jun. 21, 2005, 35 pp, for U.S. Appl. No. 10/038,165, filed Jan. 2, 2002 by inventors D.A. Burton, et al.
Request for Continued Examination IFW dated Jul. 21, 2005, 24 pp, for U.S. Appl. No. 10/038,165, filed Jan. 2, 2002 by inventors D.A. Burton, et al.
Third Office Action IFW dated Oct. 21, 2005, 18 pp, for U.S. Appl. No. 10/038,165, filed Jan. 2, 2002 by inventors D.A. Burton, et al.
Response to Third Office Action IFW dated Jan. 27, 2006, 31 pp, for U.S. Appl. No. 10/038,165, filed Jan. 2, 2002 by inventors D.A. Burton, et al.
Second Final Office Action IFW dated May 5, 2006, 5 pp, for U.S. Appl. No. 10/038,165, filed Jan. 2, 2002 by inventors D.A. Burton, et al.
Response to Second Final Office Action IFW dated Jul. 5, 2006, 24 pp, for U.S. Appl. No. 10/038,165, filed Jan. 2, 2002 by inventors D.A. Burton, et al.
Notice of Allowance IFW dated Sep. 27, 2006, 14 pp, for U.S. Appl. No. 10/038,165, filed Jan. 2, 2002 by inventors D.A. Burton, et al.

* cited by examiner

| Filename | Location of file (contains storage location address) | Status of file |
|---|---|---|
| "OS2/ windowapplication/ base.c" | "//123.46.83.137/ home/application1/ 134.c" | Unlocked |
| | | |

FIG. 2a

| Filename | Location of file (contains storage location address) | Status of file |
|---|---|---|
| "OS2/ windowapplication/ base.c" | "//123.46.83.137/ home/application1/ 134.c" | Locked by SCM Client 130 |
| | | |

| Filename | Number of accesses by SCM Client 130 | Number of accesses by SCM client 140 | File storage location |
|---|---|---|---|
| "/os2/windowapplication/base.c" | 5127 | 1 | File Storage 330 |
| "/os/kernel/main.c" | 2 | 19 | File Storage 340 |

METHOD, SYSTEM AND PROGRAM FOR DIRECT CLIENT FILE ACCESS IN A DATA MANAGEMENT SYSTEM

CROSS-REFERENCE TO RELATED APPLICATIONS

This application is a continuation of application Ser. No. 10/038,165 filed on Jan. 2, 2002, which is incorporated herein by reference in its entirety.

BACKGROUND OF THE INVENTION

1. Field of the Invention

The present invention relates to a method, system and program for providing direct file access to a client in a data management system.

2. Description of the Related Art

A source code management (SCM) system manages the source code of software projects, especially multi-programmer projects, tracking revisions to the entire software system and making all product releases consistent. When multiple programmers work on the same project, one of the primary functions of an SCM system is to provide some form of synchronization control to prevent the same version of a source file from being modified simultaneously by more than one programmer. Even when programmers or programming teams work in geographical isolation from each other, SCM systems are capable of merging individual modifications to files and groups of files without causing conflicts.

Prior art SCM systems maintain a record of versions of files and other internal components of one or more software products. A record is typically kept with each set of changes of what the changes are, why the changes were made, when the changes were made and who made the changes. Older versions can typically be recovered, and different versions can be maintained simultaneously. Some SCM systems also facilitate the tracking of software product builds that encompass various phases such as compiling, assembling, linking and so on. More advanced SCM systems can also enforce additional process management mechanisms including access control, security, approval control for modifying source code and so on. Typical SCM systems known in the art include IBM Configuration Management and Version Control (CMVC), Concurrent Versions System (CVS), Revision Control System (RCS), Source Code Control System (SCCS).

To provide an illustrative example, consider a software product being built by several teams of programmers working in geographical isolation from each other. The source files that go into building the software product are shared among the programming teams. During the course of development of the software product the files may have to be changed several times, i.e., each file may have many versions. In addition, often multiple programmers may wish to make changes to the same source code file at the same time. The changes to the files must be made without causing any conflicts or disruptions to the process of building the software product. Typically, SCM systems ensure this by providing for check-in and check-out control of source code files. When one programmer has checked-out a file to change the content the other programmers cannot make any changes to the file. In other words, when a file is checked-out, the file is locked. Other programmers can of course view the contents of the file with appropriate authority typically provided by the SCM administrator or the SCM delegate. In a common situation only after the source code of the file has been changed and a new version of the file checked-in can the other programmers check-out the file again. When a source file has been checked-out by one programmer, other programmers wanting to view the content of the file can extract the file. If a first programmer locks a file, no other programmer can make changes to the file until the first programmer has unlocked the file.

In typical prior art SCM systems, the process of limiting and auditing changes to files through the mechanism of checking files in and out is usually done by accessing a single central server, i.e. the SCM server. A storage location referred to as "file storage" is connected to, in proximity, and controlled by the SCM server. The programmers access the SCM server via SCM clients. All communications to access files from an SCM client, such as check-out, check-in, extract etc. must flow between the SCM client and the SCM server. In other words, existing SCM systems require the SCM client to access the correct version of source files only through communication with the SCM server. When an SCM client wants to access a file, the SCM client sends a request to the SCM server. The request specifies the name of the file. The name of the file is referred to as "filename". The SCM server locates the file in the file storage and controls the SCM client access to the file. If the request is for a check-out or extract the SCM server secures the file from the file storage and transmits the file to the SCM client. If the request is for a check-in, the SCM server receives the file from the SCM client and creates a new version of the file in the file storage. Since files are often large, the time to transmit and receive files is significant when compared to other activities within an SCM system. In particular, when the SCM clients are geographically dispersed and the SCM server is located across a Wide Area Network, the file access times between the SCM clients and server can be significant.

SUMMARY OF THE PREFERRED EMBODIMENTS

Provided is a method, system, and program implemented by a server for controlling and providing access to a file to at least one remote computer over a network. The server maintains metadata about files. The files are maintained at remote storage locations. The server receives a request from the remote computer for a filename of a requested file over the network. The server determines from the metadata one remote storage location address associated with the filename where the requested file is located. The server then updates the metadata for the requested file and sends the storage location address to the remote computer.

In one implementation, the server is a source code management system server, and the remote computer is a source code management system client and the network is built over the TCP/IP protocol.

In another implementation, the storage location address identifies a storage device that is at a geographical location closer to the remote computer than a location of the metadata. Implementations are provided where the request is for checking-out the file corresponding to the filename, and this involves locking the requested file, returning a response code indicating that file check-out is successful, and updating the metadata indicating that the requested file is checked-out and locked.

In further implementations, the server processes a pattern of requests for the filename received from the remote computer over time. A determination is made of one remote storage location based on the pattern of requests for the file name and the file corresponding to the filename is stored at the storage location address that is geographically closer to the remote computer. A correspondence is saved between the filename and the storage location address in the metadata.

The described implementations provide techniques for a server to store files requested by remote computers at locations more proximate to the remote computers to improve Input/Output (I/O) performance with respect to files in the remote computers request from the server by reducing the distances the files must be transmitted between the remote computers and server.

BRIEF DESCRIPTION OF THE DRAWINGS

The invention maybe better understood, and its numerous objects, features, and advantages made apparent to those skilled in the art by referencing the accompanying drawings. The use of the same reference symbols in different drawings indicates similar or identical items.

FIGS. 2a and 2b illustrate tables including information used to indicate the location of a file in accordance with implementations of the invention;

FIG. 9 illustrates a an optimal file location update table in accordance with implementations of the invention.

DETAILED DESCRIPTION OF THE PREFERRED EMBODIMENTS

Figure 1:
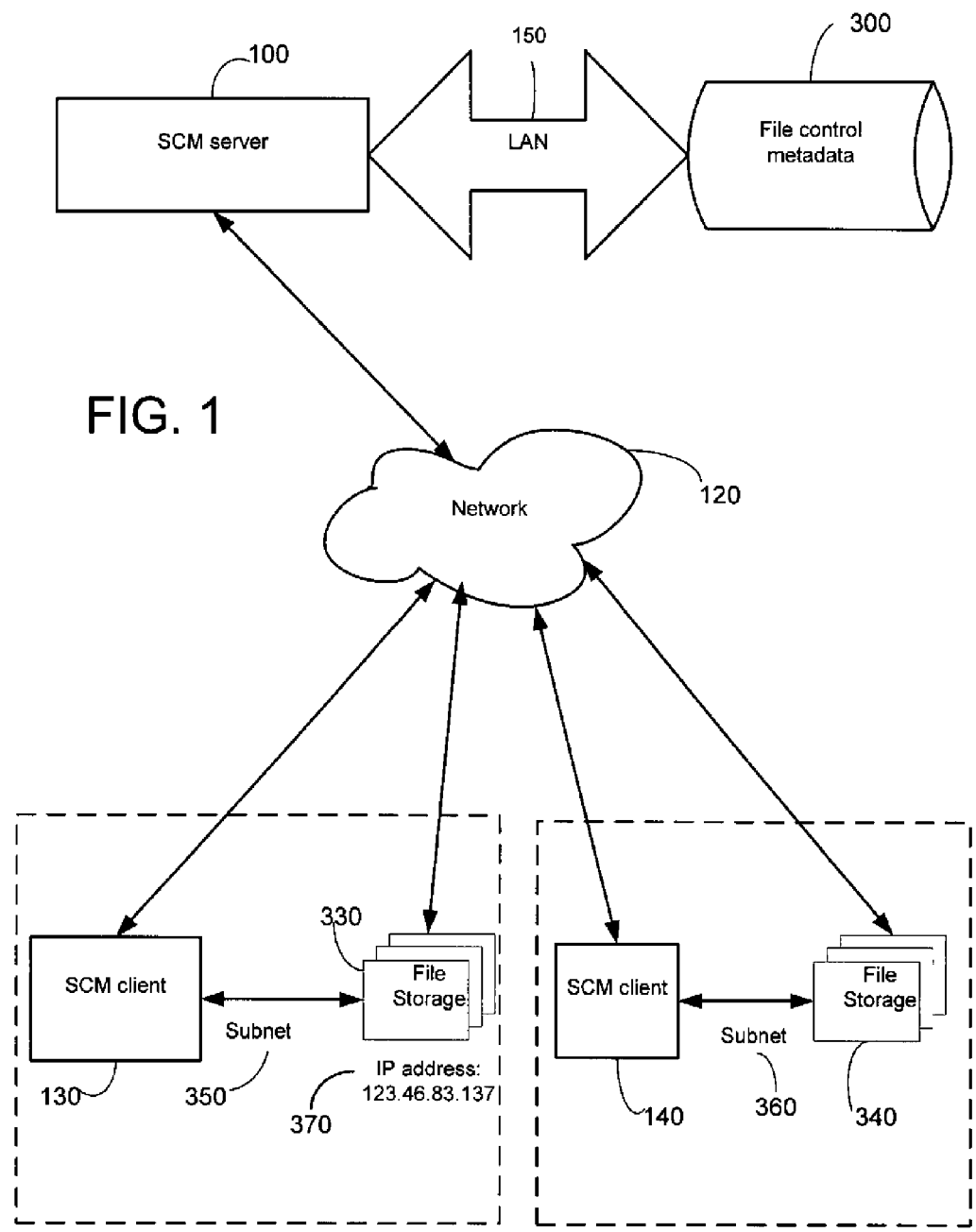
FIG. 1 is a network diagram illustrating a computing environment in which aspects of the invention are implemented.

In the following description, reference is made to the accompanying drawings which form a part hereof, and which illustrate several embodiments of the invention. It is understood that other embodiments may be utilized and structural and operational changes may be made without departing from the scope of the invention. FIG. 1 depicts a network diagram illustrating a computing environment in which aspects of the invention are implemented, and illustrates the relationship between an SCM server and SCM clients. An SCM Server 100 is connected via Network 120 to SCM clients 130 and 140. SCM clients 130 and 140 can be geographically separated by large distances. The geographical separation between SCM clients 130 and 140 is often present when a software product is jointly developed in multiple software sites that are located in different cities or countries. The Network 120 may be a Local Area Network (LAN), Internet, Intranet or any other type of network. A variety of protocols such as Hypertext Transfer Protocol (HTTP), File Transfer Protocol (FTP), Wireless Application Protocol (WAP) etc. can be used to communicate across Network 120. In addition, storage for file control metadata 300 is also connected via LAN 150 to SCM server 100. File control metadata 300 is a set of data structures that contain various attributes and properties of files. The source files of a software product are not stored in the file control metadata 300 but are resident elsewhere in the network 120.

SCM client 130 is connected to file storage 330 and both are part of subnet 350. Similarly, SCM client 140 is connected to file storage 340 and both are part of subnet 360. file storage 330 and 340 are also connected to Network 120 such that SCM server 100 can communicate with file storage 330 and 340. Communication between SCM server 100 and file storage 330 and 340 is relatively slow. However, the communication between SCM client 130 and file storage 330 is relatively fast because both SCM client 130 and file storage 330 are part of the same subnet. The same is the case with regard to relatively high communication speed between SCM client 140 and file storage 340. The actual files are stored in file storage 330 and file storage 340 whereas the file control metadata 300 stores the various attributes and properties of the files. SCM client 130 can secure files from file storage 330 relatively quickly but can secure files from file storage 340 relatively slowly. The communication between SCM client 130 and file storage 340 is across the relatively slow Network 120. The file storage 330 and 340 can be part of a Storage Area Network (SAN) or a Network Attached Storage (NAS).

For illustrative purposes the IP address "123.46.83.137" denoted by reference numeral 370 is shown associated with file storage 330. This is the network address of file storage 330. Alternatively, the file storage can be addressed using a host name, sharename, etc.

FIGS. 2a,b illustrate tables 470, 480, respectively, representing the file control metadata 300. File control metadata 300 includes information used to indicate the location of a file in accordance with implementations of the invention. The tables 470, 480 are part of the data structures of the file storage metadata 300. Other data structures can also be used to represent the file control metadata 300. The table shown in FIG. 2a has three columns. The first column contains the filename 400; the second column contains the file location 410, referred to as location of file; and the third column contains the status of file 420. An illustrative name for a file "OS2/windowapplication/base.c" 430 is shown. The location of file 430 is at "//123.46.83.137/home/application1/134.c" 440 and the status of file 430 is "Unlocked" 450. The entry reflected under the location of file entry is referred to as storage location address. In this particular example, "//123.46.83.137/home/application1/134.c" 440 is the storage location address. A possible illustrative interpretation of this can be as follows. The file "base.c" located in directory "OS2/windowapplication" in the software product source code is physically located at IP address "123.46.83.137" in directory "home/application1" and is named "134.c". Note that in FIG. 1, file storage 330 had the same IP address. Hence, "base.c" is stored as file "134.c" in file storage 330 with appropriate directories. SCM clients 130 and 140 refer to the files by the filename 400 when SCM clients 130 and 140 make a request to the SCM server 100. However, the SCM server 100 stores the actual physical file in the above example in IP address "123.46.83.137". The tables 470 or 480 in the file control metadata 300 contain the mapping of the filename 400 to the location of file 410. The file in the example shown in FIG. 2a is "Unlocked" 450 and hence the file can be checked-out by SCM clients 130 or 140. FIG. 2b is similar to FIG. 2a except that FIG. 2b shows that the Status of file 420 has changed to "Locked by SCM Client 130" 460. This state occurs when the SCM Client 130 has checked-out the file. A locked file is typically not available for check-out by another SCM client 130, 140. However, the locked file can be provided for file extract and a variety of other operations.

Figure 3:
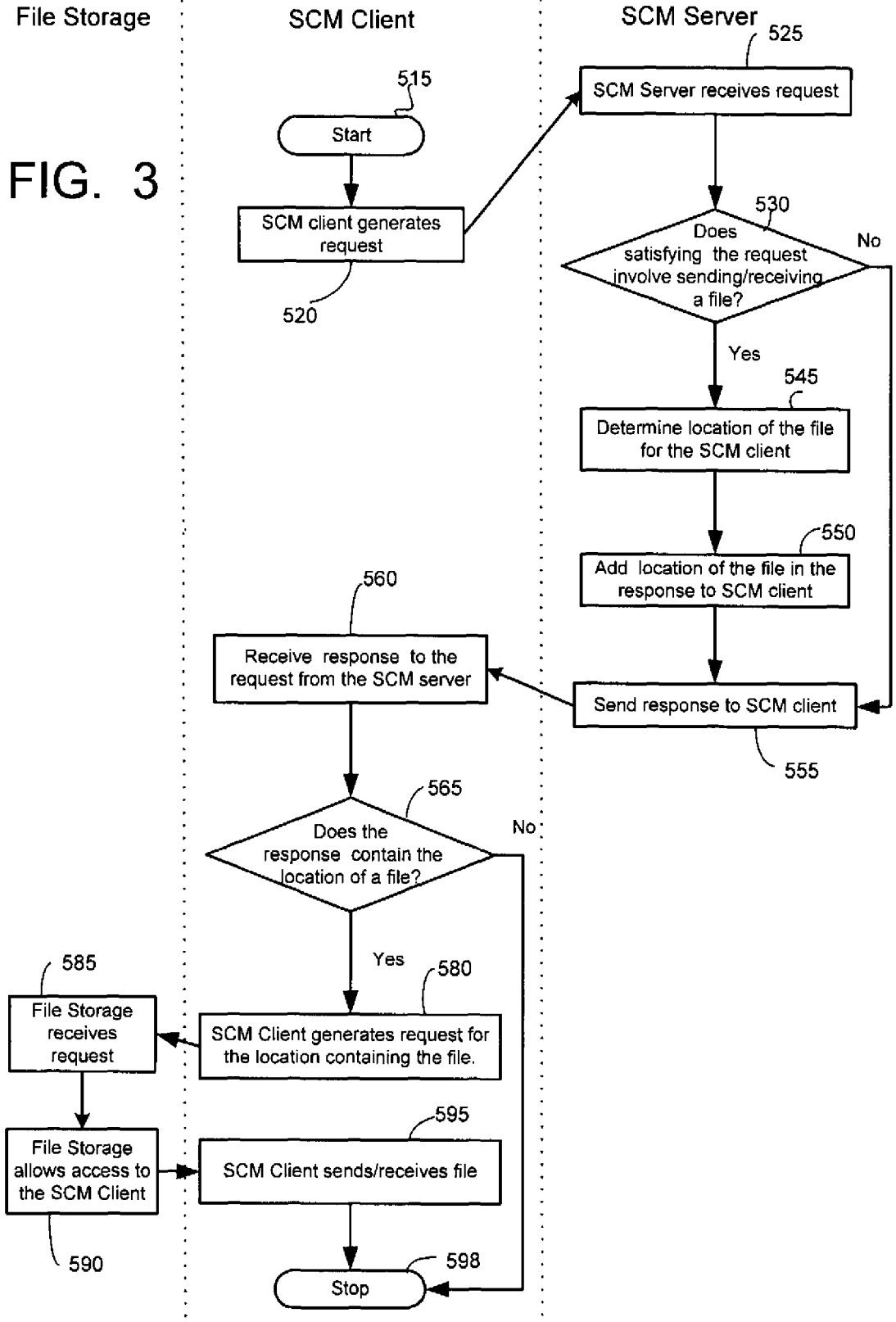
FIG. 3 is a flowchart illustrating the steps involved in the file storage, SCM client and SCM server and their relationship to each other in accordance with implementations of the invention.

FIG. 3 is a flowchart illustrating operations occurring in the file storage 330, the SCM client 130 and the SCM server 100, and their relationship to each other. The process starts at block 515 and proceeds to block 520 where the SCM client 130 generates a request. The SCM server 100 receives the request (at block 525). The SCM server 100 determines (at block 530) whether satisfying the request involves sending or receiving a file. If the answer is yes, then the location of the file for the SCM client 130 is determined (at block 545). It is possible in alternative implementations to have more than one location of the file when the file is stored in multiple locations and the corresponding management performed by the file control metadata 300. When there is more than one location of the file, the one that is geographically closest to the SCM client 130 is determined. By referring back to FIG. 2 if SCM client 130 had requested a check-out of "OS2/windowapplication/base.c", then the SCM server 100 consults the file control metadata 300 and from the table 470 indicated in FIG. 2a determines that the location of file "OS2/window application/base.c" is in "//123.46.83.137/home/application1/134.c". The location of the file is added (at block 550) to the response to the SCM client 130. The response is sent (at block 555) to the SCM client 130. In case the response in decision box 530 is "no" then no file needs to be transferred. In such case, a response is sent (at block 555) to the SCM client without indicating any file location.

The SCM client 130 receives (at block 560) the response to the request from the SCM server 100. The SCM client 130 determines (at block 565) whether the response contains the location of a file. If yes, then the SCM client 130 generates (at block 580) a request to file storage 330 for the file. In case the SCM client 130 had requested a check-out of "OS2/windowapplication/base.c", then the request for the actual content of the file would go to file storage 330, which is at TCP/IP address 123.46.83.187, which includes the requested file. In alternative implementations, the SCM server 100 can directly request file storage 330 to communicate with the SCM client 130 and in such a situation the SCM client 130 does not have to generate an explicit request to the file storage 330. The file storage 330 receives (at block 585) the request and allows (at block 590) the SCM client 130, 140 access to the file. An appropriate response code maybe sent by the file storage 330 to the SCM client 130 indicating the status of responsiveness to the request from the SCM client 130. The SCM client 130 sends or receives (at block 595) the file as the case may be. The SCM client completes the receipt (or sending) and stops processing (at block 598). Note that if the response does not contain the location of a file (at block 565), then the SCM client continues in the next step to block 598 and stops operation for the request.

With the described implementations, the SCM client 130 sends and receives the file in less time when compared to transmitting the file directly to the SCM server 100. By storing the file proximate to the SCM client 130, file transfer operations occur substantially faster and consume less long distance network bandwidth. Proximate, as that term is used herein, implies that the file is geographically close, such as within the same facility or city as the requesting SCM client 130. The file transfer time is a substantial contributor to system latency and performance delays. The described implementations provide significant improvements in the file transfer time and, hence, reduce latency.

Figure 4A:
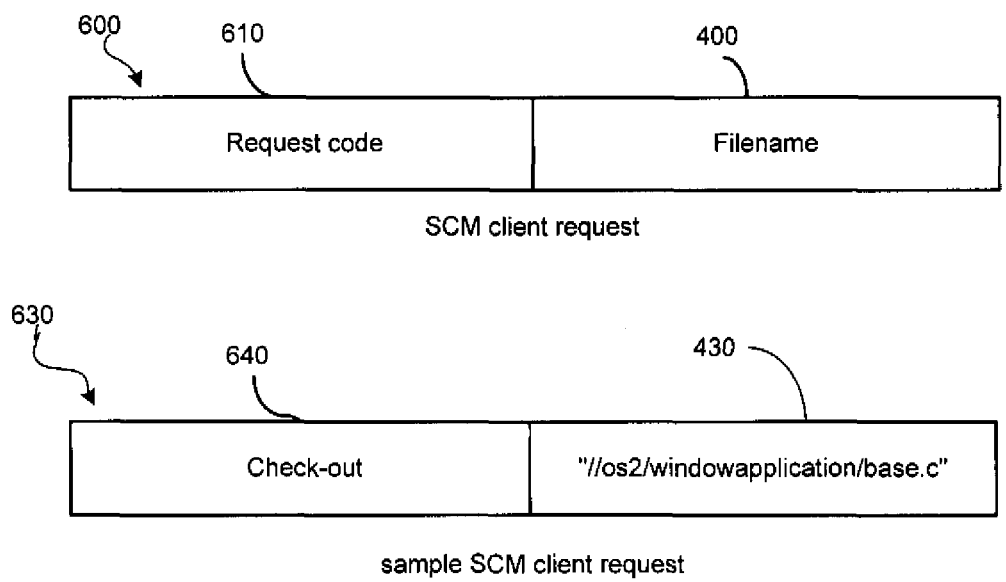
FIGS. 4a and 4b illustrate data structures for request and response in accordance with implementations of the invention.
Figure 4B:
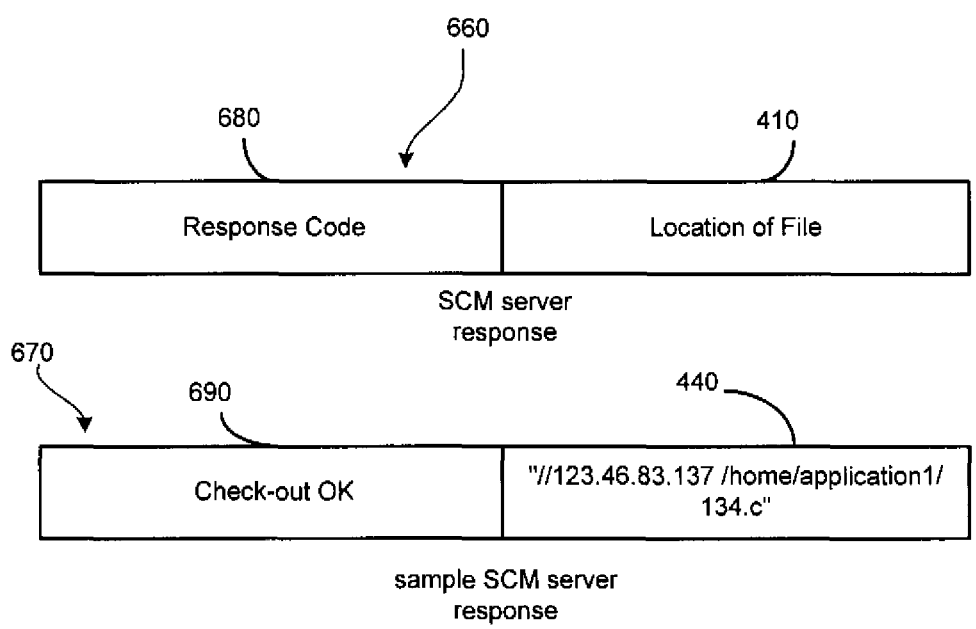

FIGS. 4a and 4b illustrate data structures for request and response in accordance with implementations of the invention. FIG. 4a shows the data structure corresponding to an SCM client request 600 and a sample SCM client request 630. The SCM client request 600 has two fields—the request code 610 and the filename 400. Note that filename 400 is provided in the tables 470, 480 in FIGS. 2a,b and refers to the name corresponding to a file referred to by an SCM client 130,140. An illustrative example of the sample SCM client request 630 shows the request code 610 as Check-out 640 and the Filename 400 as "/os2/windowapplication/base.c" 430. The example is similar to that described in FIGS. 2a and 2b. FIG. 4b shows the response data structure corresponding to an SCM server response 660 and a sample SCM server response 670. The SCM server response 660 has two fields—the Response code 680 and the Location of file 410 (Location of File 410 was described in FIGS. 2a,b). An illustrative example shows the Response code 680 as "Check-out OK" 690 and the Location of file as "//123.46.83.137/home/application1/134.c" 440. The example is similar to that described in FIGS. 2a and 2b.

Figure 5:
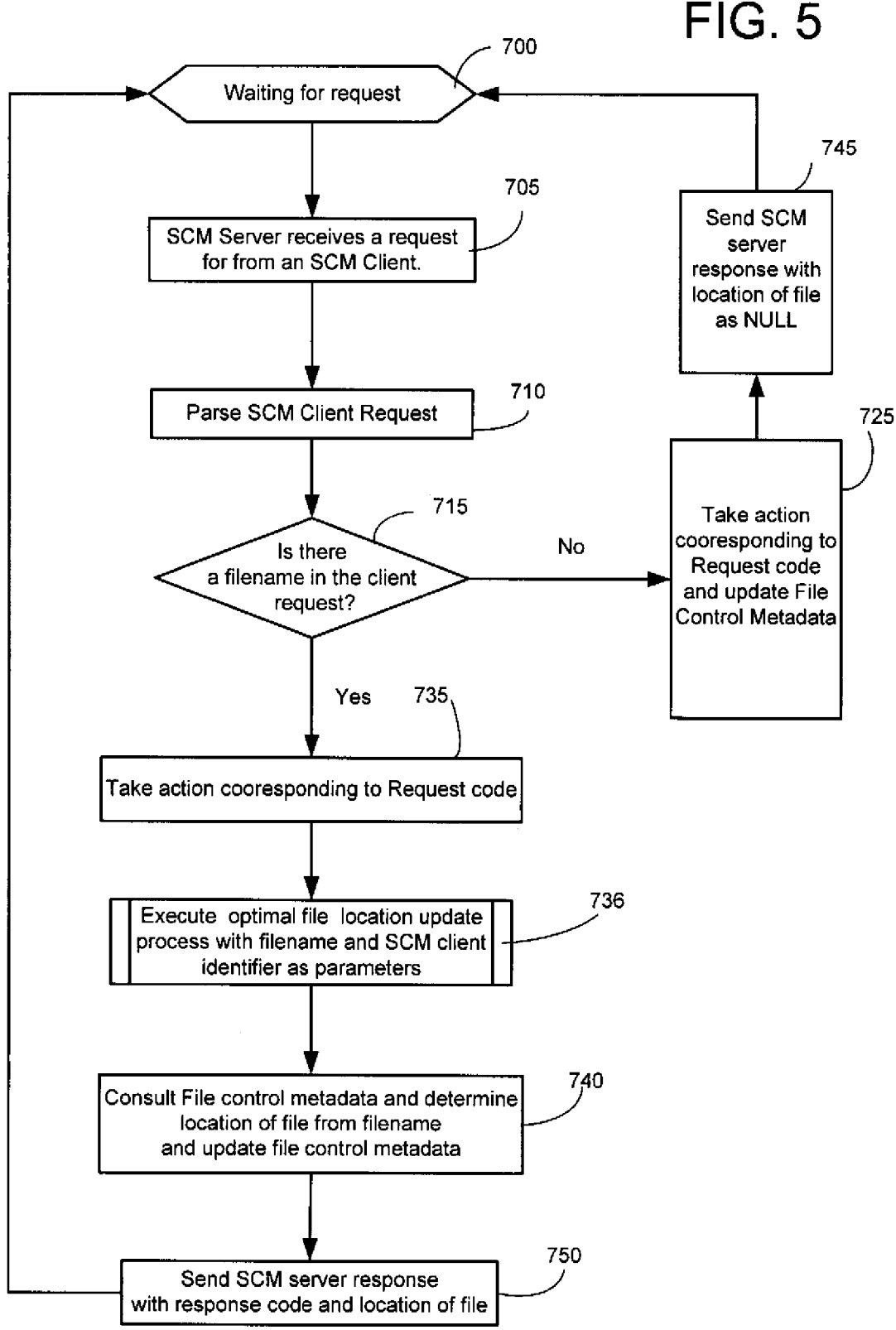
FIG. 5 is a flowchart illustrating the steps in the SCM server in accordance with implementations of the invention.

FIG. 5 is a flowchart showing the steps in the SCM server 100 in accordance with the described implementation of the invention using the data structures shown in FIGS. 2a,b and FIGS. 4a,b. The process starts with the SCM server 100 waiting (at block 700) for a request. The SCM server 100 receives (at block 705) a request 600, 630 (FIG. 4a) from an SCM client. The SCM server 100 parses the request for request code 610 and filename 400 (at block 710). SCM server 100 determines if there is a filename in the request (at block 715). If there is a filename then an action is taken corresponding to the request code 610 (at block 735). After executing block 735, the process that executes the optimal file location routine is executed (described below in FIGS. 9, 10) with the name identifying the SCM client and the filename 400 as parameters (at block 736). The optimal file location routine updates data structures including the file control metadata 300 based on the history of request patterns arriving from SCM clients 130,140 for file access, such that the location of file corresponding to a filename is appropriate. This is described below in FIGS. 9, 10. Following block 736, the file control metadata 300 is consulted and the location of file is determined from the filename as described earlier in FIGS. 4a,b and the data structures within the file control metadata 300 are updated (at block 740). Then the SCM server 100 responds (at block 750) with response code 680 and location of file 410 to the SCM client 130 and goes back to waiting (at block 700) for the next request. In case there is no filename in the client request the SCM server 100 takes action corresponding to Request code 610 and updates (at block 725) the file control metadata 300. SCM server 100 then sends (at block 745) the SCM server response 660 with the location of file 410 as NULL. Processing then continues with the SCM server 100 waiting (at block 700) for the next request.

Figure 6:
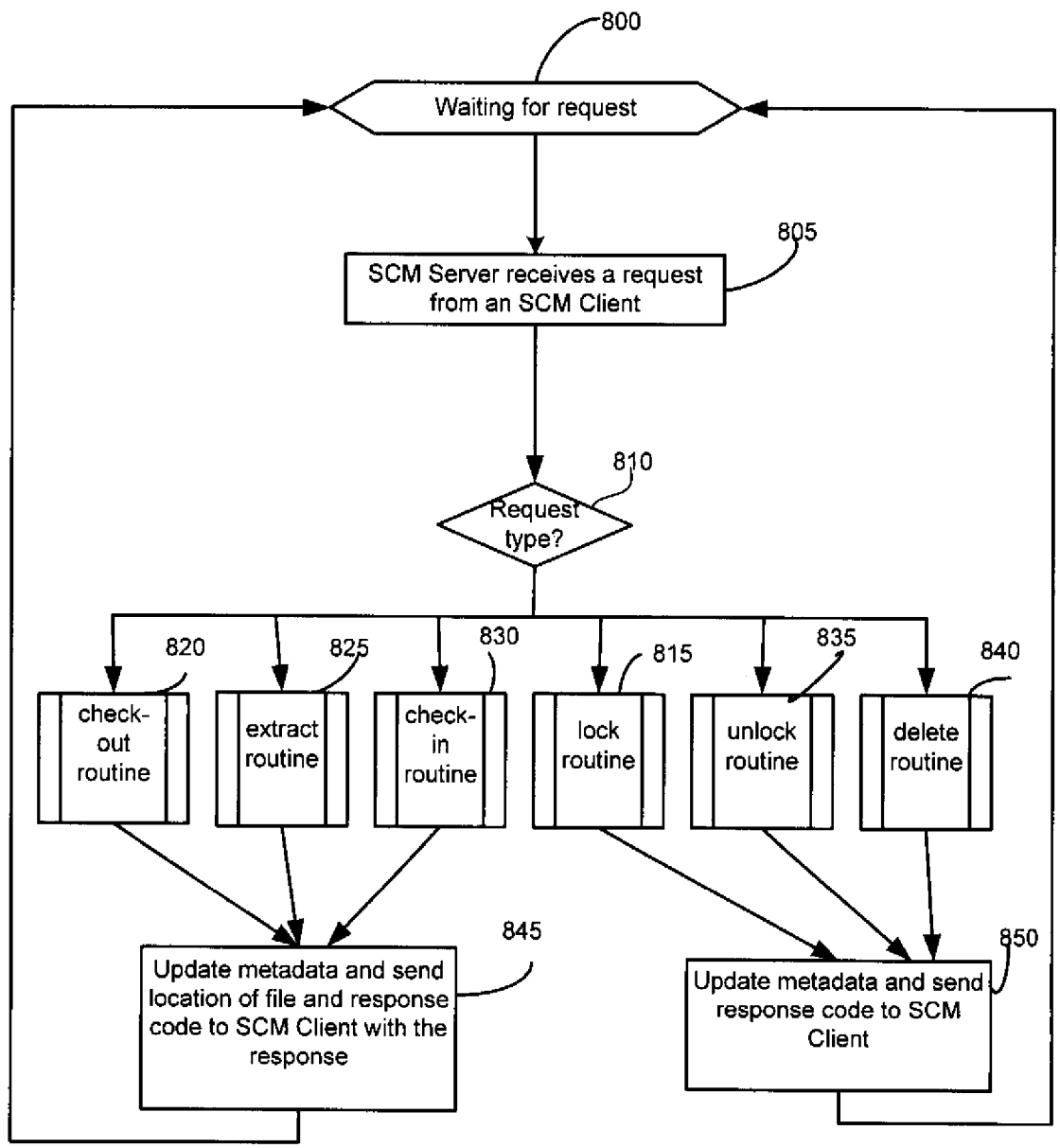
FIG. 6 is a flowchart illustrating requesting handling operations within the SCM server in accordance with implementations of the invention.

FIG. 6 is a flowchart showing how different types of requests from a client are handled within the SCM server 100. The process starts with the SCM server 100 waiting (at block 800) for a request. When SCM server 100 receives (at block 805) the request, SCM server 100 determines (at block 810) the request type. Six common request types are shown in the FIG. 6. In case the request types are check-out 820, extract 825, or check-in 830, the file control metadata 300 is updated and the location of the file to be accessed is sent (at block 845) to the SCM client 130 with the response. When the file is checked out the file is labeled as locked in the file control metadata 300. In the case of extract 825 the file is not labeled as locked. Extract 825 is for read-only access to a file by an SCM client 130. In the case of check-in 830, the file must be sent from the SCM client 130. In the case of check-in 830, after the SCM server 100 receives the filename, the SCM server 100 will determine the optimum location to store the file and will ask the SCM client 130 to store the file in such a location. In certain implementations, the file will be stored at one or more locations where the file is most geographically proximate to SCM clients most likely to request the file. Additional details are described in FIGS. 9 and 10. In case the requests are for lock 815, unlock 835, delete 840, then the appropriate subroutine is called, and the file control metadata 300 is updated and the response is sent (at block 850) to the SCM client 130. Lock 815 locks a file; unlock 835 unlocks a file; and delete 840 deletes a file. In the case of lock, unlock or delete the SCM client 130 does not need access to the actual file. The update of the file control metadata 300 is adequate. The steps of the subroutine for check-out and check-in are described below in FIGS. 7 and 8. Control proceeds from block 845 or block 850 to block 800 where the process waits for the next request from an SCM client 130, 140.

Figure 7:
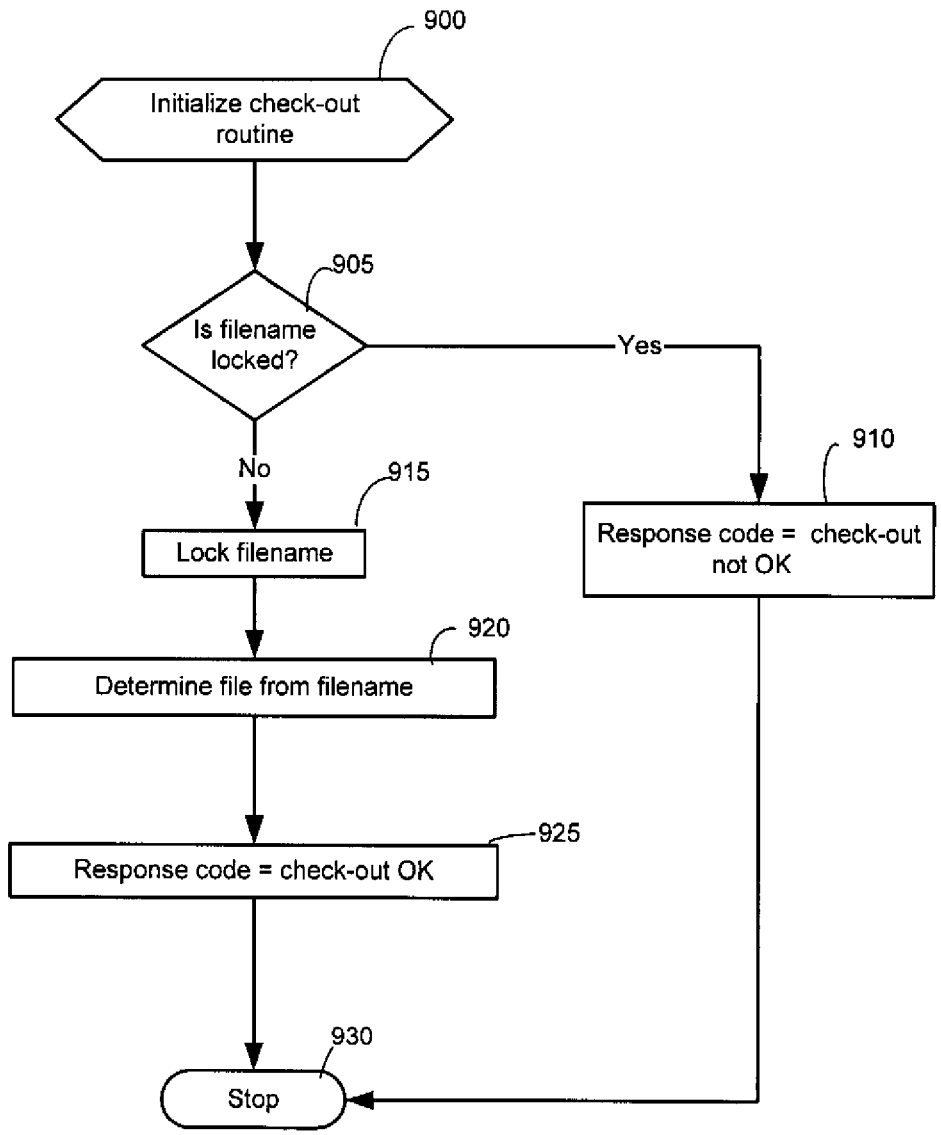
FIG. 7 is a flowchart illustrating a check-out process at an SCM server in accordance with implementations of the invention.

FIG. 7 is a flowchart illustrating logic for the check-out subroutine 820 executed in the SCM server 100. First the check-out subroutine is initialized (at block 900). Then a decision is made as to whether the filename is locked (at block 905). If the filename is locked then the file corresponding to the filename cannot be checked-out. Processing therefore continues to block 910 wherein a response code 680 corresponding to check-out not OK is generated. In contrast, if the filename is not locked, the file is locked (at block 915) and the actual file is determined from the filename by examining 300 (at block 920) the file control metadata. A response code 680 corresponding to check-out OK is generated (at block 925) and the process comes to a stop (at block 930). Subsequently block 845 is executed as shown in FIG. 6. FIG. 7 is drawn from the SCM server 100 perspective and contains the steps undergone at the server.

Figure 8:
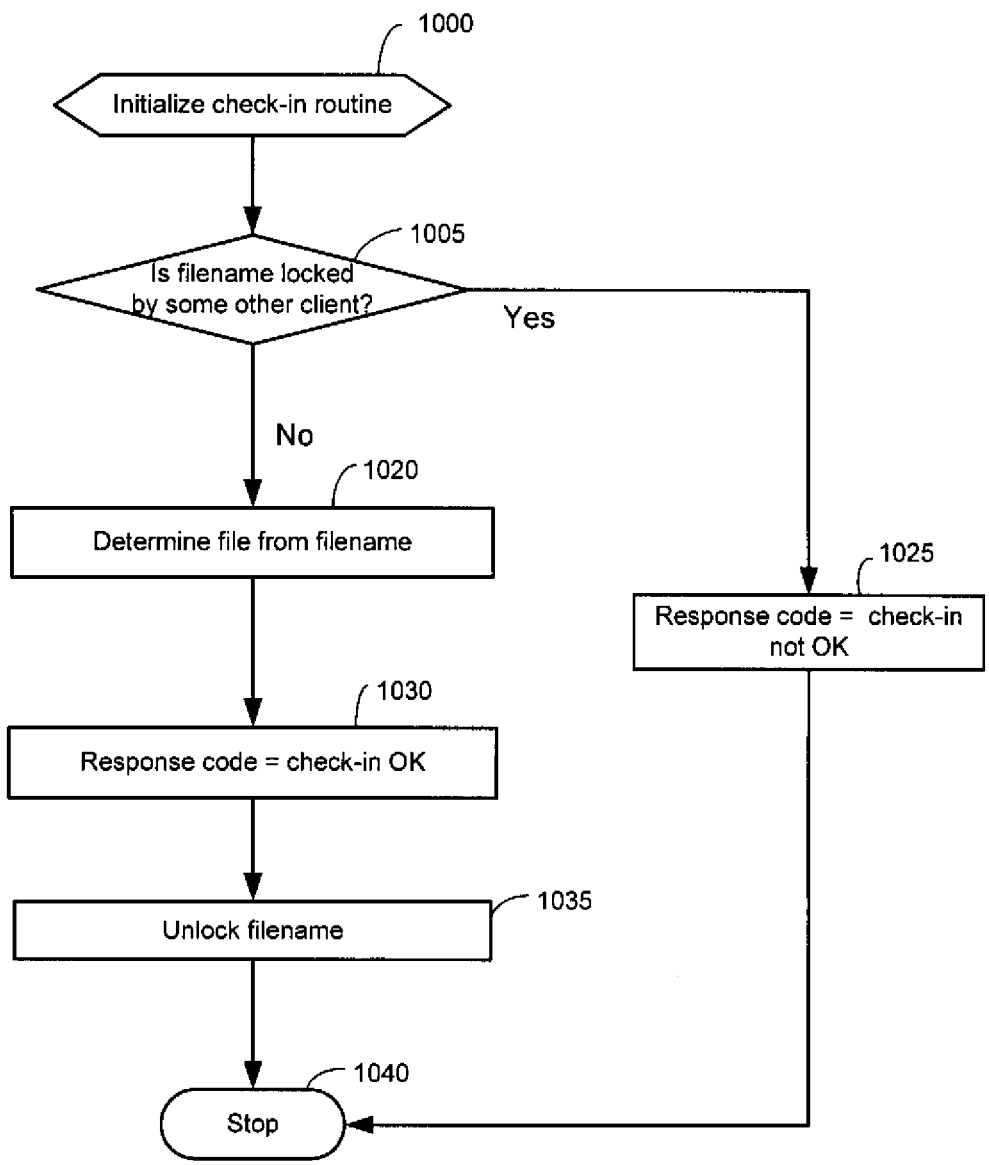
FIG. 8 is a flowchart illustrating the check-in process at an SCM server in accordance with implementations of the invention.

FIG. 8 is a flowchart illustrating the logic of the check-in subroutine 830. First, the check-in subroutine is initialized (at block 1000). A decision is made (at block 1005) as to whether the filename is locked by some other SCM client besides the requesting SCM client 130. If the filename is locked by some other SCM client other than the requesting SCM client 130, then the file corresponding to the filename cannot be checked-in. Processing therefore continues such that the response code 680 corresponding to check-in not OK is generated (at block 1025). In contrast, if the file name is not locked by some other SCM client, then the location of the file is determined (at block 1020) from the filename by examining the file control metadata 300. A response code 680 corresponding to check-in OK is generated (at block 1030), the filename is unlocked (at block 1035) and the process comes to a stop (at block 1040). Check-in of a file by an SCM client 130 can occur only after an SCM client 130 has locked the file. Check-in of a file adds a file with a new version number. At a later stage of processing (not shown in FIG. 8), the SCM client 130 utilizes the location of the file to check-in the actual file. Additional actions may be taken in the event that the SCM client 130 is unable to access the location of the file because the file storage 330 is not functional. The methods can be modified to take account of such unusual situations. Another command similar to check-in is create. Create is typically used when a file is created for the very first time.

FIG. 9 illustrates an optimal file location update table 1100, providing a data structure used by the SCM server to maintain statistics pertaining to the optimal location of a file. The optimal file location update able 1100 can be maintained either at the SCM server 100 or as an adjunct to the file control metadata 300. The table headings are filename 400, number of accesses by SCM client 130 (labeled by reference numeral 1105), number of accesses by SCM client 140 (labeled by reference number 1110), and file storage location 1115. According to the table 110, the file "/os2/windowapplication/base.c" 430 has been accessed 5127 (reference numeral 1125) times by SCM client 130 and once (reference numeral 1130) by SCM client 140 and hence file storage 330 which is proximate SCM Client 130 stores the file corresponding to "/os2/windowapplication/base.c". Likewise, in a similar manner file "/os2/kernel/main.c" is kept in file storage 340 (as denoted in optimal file location update table 1100 by reference numeral 1135) which is proximate to SCM client 140. The number of accesses by a particular SCM client is incremented each time an access occurs. Other schemes for determining where to store a file are possible. In many situations a file can be stored not just proximate to one SCM client, but can be stored in multiple locations such that the file is proximate to multiple SCM clients.

Figure 10:
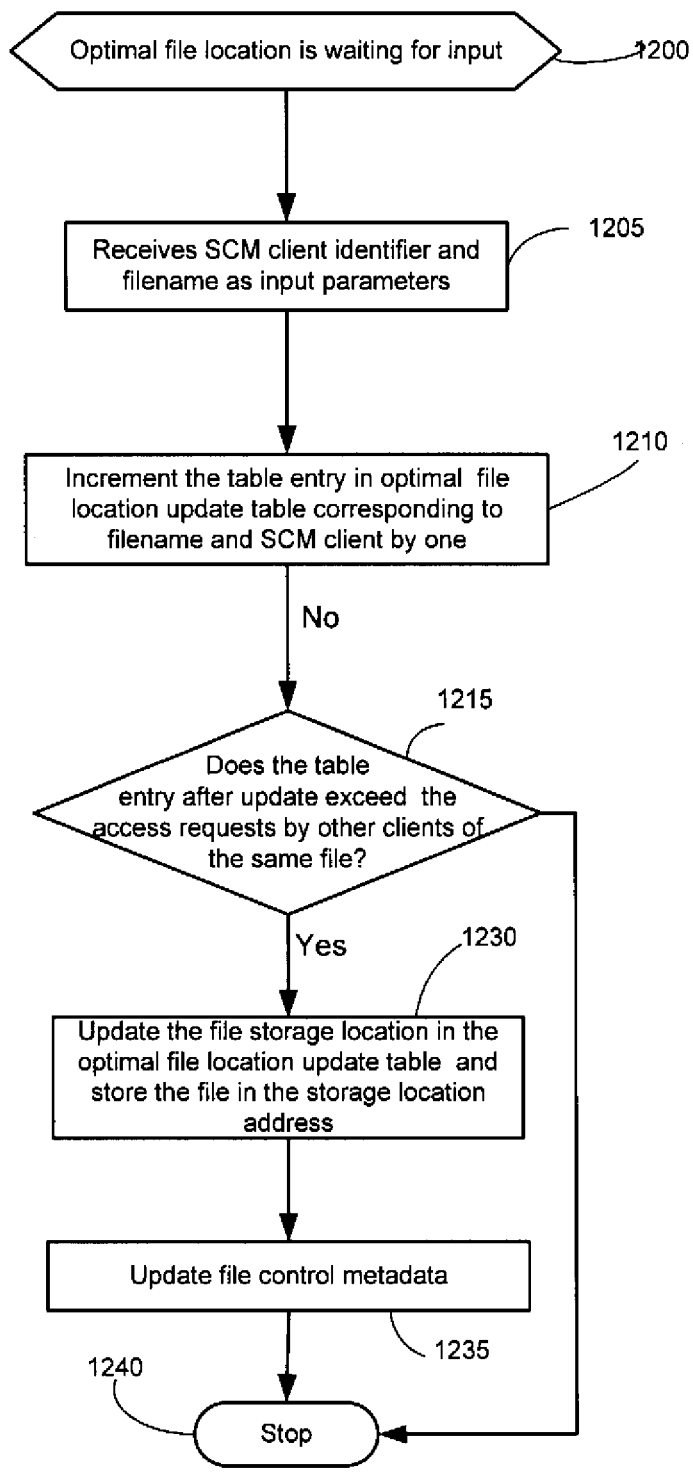
FIG. 10 is a flowchart illustrating the optimal location of a file at an SCM server based on the request patterns from SCM clients in accordance with implementations of the invention.

FIG. 10 is a flowchart illustrating logic implemented in the SCM server 100 showing how the optimal location of a file can be updated at the SCM server 100 based on the request patterns from SCM clients. The process waits for input in block 1200. The SCM server 100 receives (at block 1205) the SCM client identifier corresponding to the request of an SCM client 130 to the SCM server 100 and the filename 400 (for example, "/os2/windowapplication/base.c" 430) contained in the request. The SCM server 100 then increments the appropriate table entry 1125 in the file location update table 1100 (at block 1210). The table entry 1125 corresponding to the filename 400 ("/os2/windowapplication/base.c" 430) and SCM client 130 reflects that the particular filename has been requested for access by an SCM client 130 one more time than before. The SCM server 100 continues to determine whether the table entry 1125 after the update exceeds the access requests by other SCM clients of the same file (at block 1215). If the number of requests by the SCM client does not exceed the maximum number of request in the table entry 1128, the SCM server 100 determines (at block 1215) whether the number of requests from the client would become larger than the number of requests in the table entry 1225 after the increment. If the number of requests for the file by the requesting client does not exceed the value in the table entry 1128, the process stops (at block 1240). Otherwise, the file storage location 1115 is updated in the optimal file location update table 1100, and the file stored (at block 1230) in the corresponding storage location address. Block 1230 may be performed at periodic intervals say on a weekly or daily basis rather than immediately at the conclusion of block 1215 in order to avoid using substantial network bandwidth and other resources to frequently move the file to different locations. The file storage location is chosen to be proximate to the SCM client based on the configuration of the overall network. The file storage location is selected to minimize a distance the requested file is transmitted between each SCM client and the file storages based on the number of requests for the file from each SCM client.

File control metadata 300 is updated to reflect the proper filename and location of file (at block 1235). The process then comes to a stop (at block 1240). The file is stored in one place only in the above implementation. However, other implementations can be constructed where the file is stored in multiple location.

Additional Implementation Details

The described implementations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Many of the examples provided have shown only source files being accessed. However, in most SCM systems binary files can be equally accessed in an equivalent manner and the invention encompasses the access methods and access patterns for binary files, documentation files, comment files and any other types of file that are present in SCM systems.

While the invention has been described with an SCM system having check-in, check-out, delete, extract, lock and unlock procedures there may be other procedures that can be implemented in a manner equivalent to that described in the invention. For example, many SCM systems have complex procedures for release and component management. The file accesses involved for such processes are also covered by the invention. Similarly, multiple files can often be requested by an SCM client in a single command and this can be accommodated into the invention.

While the invention has been described as potentially updating the file storage location at every request, variations can be constructed where the file storage location is updated only at periodic intervals, possibly on a daily or weekly basis. Similarly, the invention has been described with a file being stored in one file storage location. However, variations can be constructed where the same file is stored in multiple file storage locations and this is included within the scope of the invention. The invention has described the situation where the SCM clients request access to the file from the proximate file storage. In alternative implementations the SCM server could request the file storage to directly interact with the SCM client. In such a situation the file storage could directly send or receive files to or from the SCM client.

In certain implementations, the SCM client and SCM maybe part of an integrated software system. For example, in the SCM system known as CMVC there are CMVC servers and CMVC clients. However, all SCM clients need not have similar internal software implementations. It is possible for dissimilar SCM clients produced by different entities to interoperate with an SCM server. The invention encompasses such scenarios. In addition, we have not discussed in detail how SCM clients can access files. The access can be achieved by distributed file systems such as Andrew File System (AFS) or Common Internet File System (CIFS). Clients can also access files by protocols such as FTP, HTTP, or WAP.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for controlling and providing access to a file to at least one remote computer over a network, the method comprising:
   maintaining metadata about files maintained at remote storage locations, wherein the metadata indicates remote storage location addresses corresponding to the files;
   receiving a request from the remote computer for a filename of a requested file over the network, wherein the remote computer is a source code management system client;
   determining from the metadata one remote storage location address associated with the filename where the requested file is located, wherein the metadata includes indications of the number of accesses of the files by a plurality of source code management system clients, wherein the remote storage location address is based on a history of request patterns from a plurality of source code management system clients, wherein the history of request patterns includes the indications of the number of accesses of the files by the plurality of source code management system clients, wherein copies of the requested file are located in a plurality of remote storage locations, and wherein the one remote storage location address associated with the filename where the requested file is located is more proximate to the source code management system client in comparison to other source code management system clients of the plurality of source code management system clients;
   updating the metadata for the requested file; and
   sending the storage location address to the remote computer, wherein the one remote storage location address identifies a storage device that is at a geographical location closer to the remote computer than a location of the metadata.

2. The method of claim 1, wherein the request is for checking-out the requested file corresponding to the filename, the method further comprising:
   locking the requested file;
   returning a response code to the remote computer indicating that file check-out is successful; and
   updating the metadata indicating that the requested file is checked-out and locked.

3. The method of claim 1, wherein the request is for checking-in the requested file corresponding to the filename, the method further comprising:
   updating the metadata indicating the requested file is unlocked; and
   returning a response code indicating that the file check-in is successful.

4. The method of claim 1, the method further comprising:
   processing a pattern of requests for the file received from remote computers at different geographical locations;

determining one of a plurality of remote storage locations based on the pattern of requests for the file;

storing the file corresponding to the file at the determined remote storage location; and saving a correspondence between the file and the storage location address in the metadata.

5. The method of claim 4, wherein the determined remote storage location is at a geographical location that is more proximate to the remote computer having more requests for the file than other remote computers.

6. The method of claim 4, wherein the determined remote storage location is selected from the plurality of remote storage locations to minimize a distance the requested file is transmitted between each remote computer and the remote storage location based on the number of requests for the file from each remote computer.

7. The method of claim 1, wherein the remote computer is a source code management system client, and the request is one of check-in, check-out, extract, lock, unlock, delete.

8. A method for accessing a file in a source code management system, the method comprising:

sending, by a source code management system client, a first request for a file, wherein metadata is maintained about files maintained at remote storage locations, wherein the metadata indicates remote storage location addresses corresponding to the files;

receiving a remote storage location address containing the file in response to the first request, wherein the metadata includes indications of the number of accesses of the files by a plurality of source code management system clients, wherein the remote storage location address is based on a history of request patterns from a plurality of source code management system clients, wherein the history of request patterns includes the indications of the number of accesses of the files by the plurality of source code management system clients, wherein copies of the requested file are located in a plurality of remote storage locations, wherein the remote storage location address where the file is contained is more proximate to the source code management system client in comparison to other source code management system clients of the plurality of source code management system clients, and wherein the file has an associated filename;

sending a second request to the remote storage location address; and receiving an access to the file from the remote storage location address, wherein the remote storage location address identifies a storage device that is at a geographical location closer to the remote computer than a location of the metadata.

9. The method of claim 8, wherein the first request is for checking-out the file, the method further comprising:

downloading the file from the remote storage location address.

10. The method of claim 8, wherein the first request is for checking-in the file, the method further comprising:

sending a new version of the file to the remote storage location address.

11. The method of claim 8, the method further comprising:

receiving a first response code from a remote computer in response to the first request; and receiving a second response code from the storage location in response to the second request.

12. A system for controlling and providing access to a file to remote computers over a network, wherein remote storage locations are accessible over the network, the system comprising:

a processor; and a server coupled to the processor, wherein the server performs operations, the operations comprising:

maintaining metadata about files maintained at remote storage locations, wherein the metadata indicates remote storage location addresses corresponding to the files;

receiving a request from a remote computer for a filename of a requested file over the network, wherein the remote computer is a source code management system client;

determining from the metadata one remote storage location address associated with the filename where the requested file is located, wherein the metadata includes indications of the number of accesses of the files by a plurality of source code management system clients, wherein the remote storage location address is based on a history of request patterns from a plurality of source code management system clients, wherein the history of request patterns includes the indications of the number of accesses of the files by the plurality of source code management system clients, wherein copies of the requested file are located in a plurality of remote storage locations, and wherein the one remote storage location address associated with the filename where the requested file is located is more proximate to the source code management system client in comparison to other source code management system clients of the plurality of source code management system clients;

updating the metadata for the requested file; and sending the storage location address to the remote computer, wherein the one remote storage location address identifies a storage device that is at a geographical location closer to the remote computer than a location of the metadata.

13. The system of claim 12, wherein the request is for checking-out the requested file corresponding to the filename, the operations further comprising:

locking the requested file;

returning a response code to the remote computer indicating that file check-out is and updating the metadata indicating that the requested file is checked-out and locked.

14. The system of claim 12, wherein the request is for checking-in the requested file corresponding to the filename, and further comprising:

updating the metadata indicating the requested file is unlocked; and returning a response code indicating that the file check-in is successful.

15. The system of claim 12, the operations further comprising:

processing a pattern of requests for the file received from remote computers at different geographical locations;

determining one of a plurality of remote storage locations based on the pattern of requests for the file;

storing the file corresponding to the file at the determined remote storage location; and saving a correspondence between the file and the storage location address in the metadata.

16. The system of claim 15, wherein the determined remote storage location is at a geographical location that is more proximate to the remote computer having more requests for the file than other remote computers.

17. The system of claim 15, wherein the determined remote storage location is selected from the plurality of remote storage locations to minimize a distance the requested file is transmitted between each remote computer and the remote storage location based on the number of requests for the file from each remote computer.

18. The system of claim 12, wherein the remote computer is a source code management system client, and the request is one of check-in, check-out, extract, lock, unlock, delete.

19. A system for accessing a file of a plurality of files in a source code management system maintained at least in a server, the system comprising:
   a processor;
   a remote computer coupled to the processor and in communication with the server, wherein the remote computer is a source code management system client, and wherein the remote computer performs operations, the operations comprising:
   sending, a first request for a file, wherein metadata is maintained about files maintained at remote storage locations, wherein the metadata indicates remote storage location addresses corresponding to the files;
   receiving a remote storage location address containing the file in response to the first request, wherein the metadata includes indications of the number of accesses of the files by a plurality of source code management system clients, wherein the remote storage location address is based on a history of request patterns from a plurality of source code management system clients, and wherein the history of request patterns includes the indications of the number of accesses of the files by the plurality of source code management system clients, wherein copies of the requested file are located in a plurality of remote storage locations, wherein the remote storage location address where the file is contained is more proximate to the source code management system client in comparison to other source code management system clients of the plurality of source code management system clients, and wherein the file has an associated filename;
   sending a second request to the remote storage location address; and
   receiving an access to the file from the remote storage location address, wherein the remote storage location address identifies a storage device that is at a geographical location closer to the remote computer than a location of the metadata.

20. The system of claim 19, wherein the first request is for checking-out the file, the operations further comprising:
   downloading the file from the remote storage location address.

21. The system of claim 19, wherein the first request is for checking-in the file, the operations further comprising:
   sending a new version of the file to the remote storage location address.

22. The system of claim 19, the operations further comprising:
   receiving a first response code from a remote computer in response to the first request; and
   receiving a second response code from the storage location in response to the second request.

23. A computer readable storage, wherein code for controlling and providing access to a file at storage locations on a network to a remote computer is stored in the computer readable storage, and wherein the code is capable of causing operations, the operations comprising:
   maintaining metadata about files maintained at remote storage locations, wherein the metadata indicates remote storage location addresses corresponding to the files;
   receiving a request from the remote computer for a filename of a requested file over the network, wherein the remote computer is a source code management system client;
   determining from the metadata one remote storage location address associated with the filename where the requested file is located, wherein the metadata includes indications of the number of accesses of the files by a plurality of source code management system clients, wherein the remote storage location address is based on a history of request patterns from a plurality of source code management system clients, wherein the history of request patterns includes the indications of the number of accesses of the files by the plurality of source code management system clients, wherein copies of the requested file are located in a plurality of remote storage locations, and wherein the one remote storage location address associated with the filename where the requested file is located is more proximate to the source code management system client in comparison to other source code management system clients of the plurality of source code management system clients;
   updating the metadata for the requested file; and
   sending the storage location address to the remote computer, wherein the one remote storage location address identifies a storage device that is at a geographical location closer to the remote computer than a location of the metadata.

24. The computer readable storage of claim 23, wherein the request is for checking-out the requested file corresponding to the filename, the operations further comprising:
   locking the requested file;
   returning a response code to the remote computer indicating that file check-out is successful; and
   updating the metadata indicating that the requested file is checked-out and locked.

25. The computer readable storage of claim 23, wherein the request is for checking-in the requested file corresponding to the filename, the operations further comprising:
   updating the metadata indicating the requested file is unlocked; and
   returning a response code indicating that the file check-in is successful.

26. The computer readable storage of claim 23, the operations further comprising:
   processing a pattern of requests for the file received from remote computers at different geographical locations;
   determining one of a plurality of remote storage locations based on the pattern of requests for the file;
   storing the file corresponding to the file at the determined remote storage location; and saving a correspondence between the file and the storage location address in the metadata.

27. The computer readable storage of claim 26, wherein the determined remote storage location is at a geographical location that is more proximate to the remote computer having more requests for the file than other remote computers.

28. The computer readable storage of claim 26, wherein the determined remote storage location is selected from the plurality of remote storage locations to minimize a distance the requested file is transmitted between each remote computer and the remote storage location based on the number of requests for the file from each remote computer.

29. The computer readable storage of claim 23, wherein the remote computer is a source code management system client, and the request is one of check-in, check-out, extract, lock, unlock, delete.

30. A computer readable storage, wherein code for accessing a file of a plurality of files in a source code management system is stored in the computer readable storage, wherein the code is capable of causing operations, the operations comprising:

sending, by a source code management system client, a first request for a file, wherein metadata is maintained about files maintained at remote storage locations, wherein the metadata indicates remote storage location addresses corresponding to the files;

receiving a remote storage location address containing the file in response to the first request, wherein the metadata includes indications of the number of accesses of the files by a plurality of source code management system clients, wherein the remote storage location address is based on a history of request patterns from a plurality of source code management system clients, and wherein the history of request patterns includes the indications of the number of accesses of the files by the plurality of source code management system clients, wherein copies of the requested file are located in a plurality of remote storage locations, wherein the remote storage location address where the file is contained is more proximate to the source code management system client in comparison to other source code management system clients of the plurality of source code management system clients, and wherein the file has an associated filename;

sending a second request to the remote storage location address; and receiving an access to the file from the remote storage location address, wherein the remote storage location address identifies a storage device that is at a geographical location closer to the remote computer than a location of the metadata.

31. The computer readable storage of claim 30, wherein the first request is for checking-out the file, the operations further comprising:

downloading the file from the remote storage location address.

32. The computer readable storage of claim 30, wherein the first request is for checking-in the file, the operations further comprising:

sending a new version of the file to the remote storage location address.

33. The computer readable storage of claim 30, the operations further comprising:

receiving a first response code from a remote computer in response to the first request; and receiving a second response code from the storage location in response to the second request.

* * * * *